United States Patent [19]

Suzuki

[11] Patent Number: 4,878,068
[45] Date of Patent: Oct. 31, 1989

[54] BEAM RECORDER HAVING A VARYING BEAM INTENSITY FOR MAINTAINING A TRUE REPRODUCED IMAGE

[75] Inventor: Yoshiyuki Suzuki, Kawasaki, Japan
[73] Assignee: Canon Kabushiki Kaisha, Tokyo, Japan
[21] Appl. No.: 91,773
[22] Filed: Sep. 1, 1987

[30] Foreign Application Priority Data

Sep. 8, 1986 [JP] Japan .................................. 61-209709

[51] Int. Cl.$^4$ ........................... G01D 9/42; H04N 1/21
[52] U.S. Cl. ...................................... 346/108; 358/296
[58] Field of Search ................. 346/108, 107 R, 76 L, 346/160; 358/296, 300, 302, 298

[56] References Cited

U.S. PATENT DOCUMENTS

| | | | |
|---|---|---|---|
| 4,361,394 | 11/1982 | Sakai | 355/8 |
| 4,387,983 | 6/1983 | Masegi. | |
| 4,476,474 | 10/1984 | Kitamura. | |
| 4,517,579 | 5/1985 | Kitamura. | |
| 4,558,328 | 12/1985 | Takanaski. | |
| 4,677,493 | 6/1987 | Shinya | 358/298 |
| 4,709,250 | 11/1987 | Takeuchi | 346/160 |

FOREIGN PATENT DOCUMENTS

| | | |
|---|---|---|
| 3129109 | 3/1982 | Fed. Rep. of Germany. |
| 3212194 | 10/1982 | Fed. Rep. of Germany. |
| 56-081990 | 4/1981 | Japan. |
| 60-210471 | 10/1985 | Japan. |
| 2170372 | 7/1986 | United Kingdom. |

Primary Examiner—E. A. Goldberg
Assistant Examiner—Mark Reinhart
Attorney, Agent, or Firm—Fitzpatrick, Cella, Harper & Scinto

[57] ABSTRACT

A beam recorder comprises image signal input means, a modulator for modulating a recording beam in accordance with the input image signal, and a discriminator for discriminating a characteristic of the input image signal. The modulator controls a driving current for emitting the beam so that the beam intensity is varied in accordance with the discrimination result.

13 Claims, 8 Drawing Sheets

BEAM RECORDER HAVING A VARYING BEAM INTENSITY FOR MAINTAINING A TRUE REPRODUCED IMAGE

BACKGROUND OF THE INVENTION

1. Field of the Invention

The present invention relates to a beam recorder for forming an image on a record medium by a beam.

2. Related Background Art

In a laser beam printer which turns on and off a laser beam in accordance with an image signal and forms an image by an electro-photographic system, two methods have been proposed with respect to the turn on/off of the laser beam and the image to be recorded.

One is so-called image scan system (negative development system) in which the laser beam is turned on at points corresponding to black pixels of the image and turned off at points corresponding to white pixels.

The other is so-called background scan system (positive development system) in which the laser beam is turned off at the points corresponding to the black pixels and turned on at the points corresponding to the white pixels.

In the image scan system and background scan system, the charging polarities of toner used to visualize an electrostatic latent image in a development process are opposite to each other.

Figure 10:
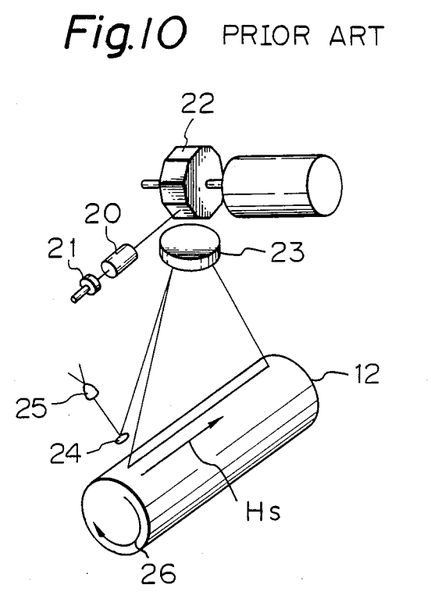
FIG. 10 illustrates a principle of an image forming circuit of a laser printer.

FIG. 10 shows a principle of an image forming unit of a conventional laser beam printer. An image signal is applied to a laser beam source 21 and a laser beam is turned on and off in accordance with the image signal. The laser beam emitted by the laser beam source 21 passes through a collimater lens 20 and is collimated, and then focused to a predetermined beam diameter, directed to a rotating polygon mirror 22 which rotates at a constant speed, and is scanned over a surface of a photoconductor 12. A light reflected by the rotating polygon mirror 22 is corrected for light path by a correcting optical system 23 (fθ lens) and then focused onto the photoconductor 12. The laser beam is scanned on the photoconductor 12 in a direction of an arrow Hs one for each mirror plane as the rotating polygon mirror 22 rotates. Since the photoconductor 12 which has been uniformly charged by a charger (not shown) rotates at a constant speed in a direction shown by an arrow 26, the laser beam is two-dimensionally scanned so that an electrostatic latent image is formed on the photoconductor 12 in accordance with the turn-on and turn-off of the laser beam.

A portion of the scan light is reflected by a reflection mirror 24 provided at a predetermined position ahead of the scan area of the photoconductor 12 by the laser beam, directed to a photo-sensor 25 and converted to an electrical signal. This signal is used as a horizontal synchronization signal.

The electrostatic latent image thus formed on the photoconductor 12 is developed and transferred to a record sheet to record an image in a known electrophotographic method.

In recent years, most of the images printed by such a laser beam printers are document images. In the document image, the number of white pixels is usually much more than the number of black pixels.

In the image scan system, the laser beam is turned on only when the black pixels are to be formed. Accordingly, when the document image is to be outputted, an accumulated turn-on time of the laser beam is short and hence the image scan system is advantageous over the background scan system when a semiconductor laser having a short accumulated turn-on lifetime is used as a laser beam source. On the other hand, when a solid black image comprising continuous black pixels is to be printed, a spacing between scan lines slightly varies due to a plane angle precision of the planes of the rotating polygon mirror and a mechanical vibration thereof and a stripe pattern appears along the direction of movement of the photoconductor.

On the other hand, in the background scan system, the laser beam is not turned on at the black pixel areas and hence a uniform black area is printed.

There is also a difference between the image scan system and the background scan system when a fine line in the order of one pixel width is to be reproduced. This is due to the fact that an energy of a laser beam spot focused on the photoconductor may be considered to have a two-dimension Gauss distribution, and latent image formed on the photoconductor by such spots and a development characteristic.

The reproduction of the fine line by the respective systems is explained with reference to FIGS. 3A and 3B and FIGS. 4A and 4B.

Figure 3A:
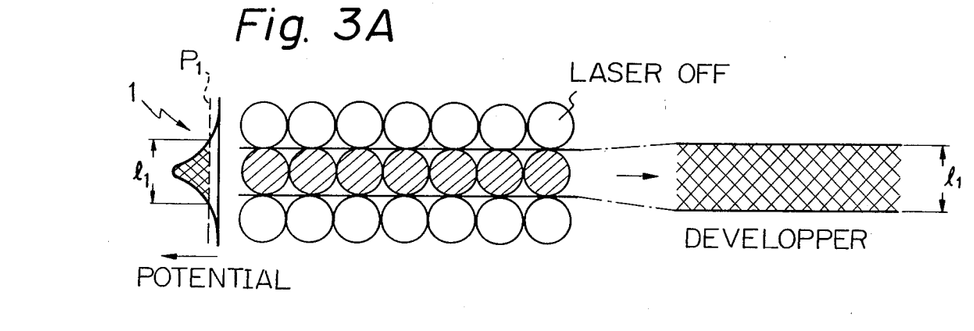
FIGS. 3A and 3B illustrate reproduction of a fine line in an image scan system.
Figure 3B:
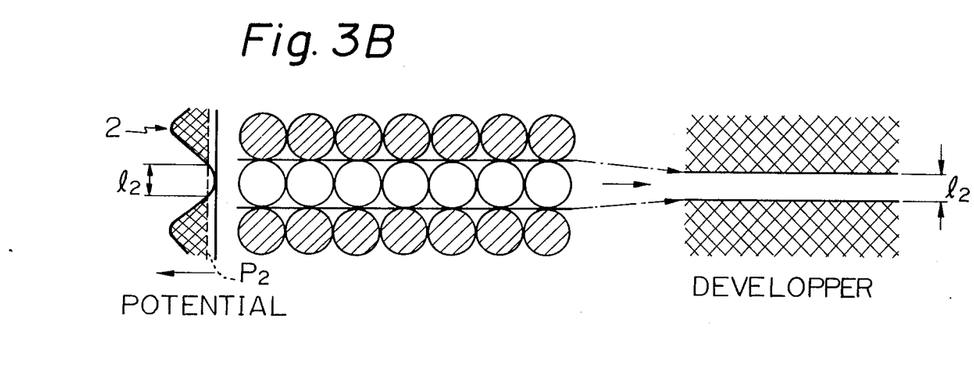

FIGS. 3A and 3B illustrate the formation of the fine line by the image scan system. In FIG. 3A, a black line of one line width is to be formed, and in FIG. 3B, a white line of one line width is to be formed. Each circle corresponds to one pixel, and ○ (white circle) indicates that the laser beam is not turned on and ● (hatched circle) indicates that the laser beam is turned on. An electrostatic latent image formed on the photoconductor has a Gauss energy distribution of laser spot as shown by 1 and 2 of FIGS. 3A and 3B. Thus, the energy spreads to the periphery and the black pixel area after the development is wider than one pixel area because of the development characteristic of the electrophotography. $P_1$ and $P_2$ represent development threshold levels of the electrostatic latent image. Thus, the black fine line is thickened while the white fin line is narrowed. Namely, the width $l_1$ of the black fine line is wider than one pixel width and the width $l_2$ of the white fine line is narrower than one pixel width.

As a result, when a complex character such as a Kanji character of a small size is to be printed, the character is distorted by the thickening of the black fine line and the narrowing of the white fine line. When the beam spot diameter is increased or the development threshold level is lowered so that the adjacent black pixels overlap in order prevent ununiformity in the solid black due to the limitation on the precision of the scanning optical system, the above trend is more and more accelerated, and in an extreme case, the white fine line of one pixel width disappears.

Figure 4A:
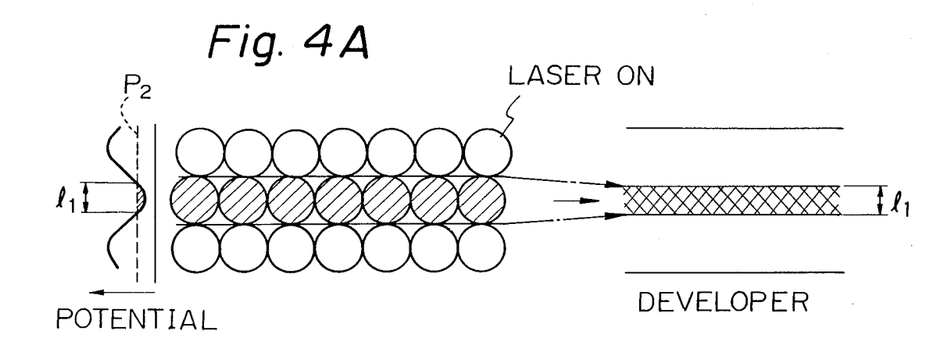
FIGS. 4A and 4B illustrate reproduction of a fine line in a background scan system.
Figure 4B:
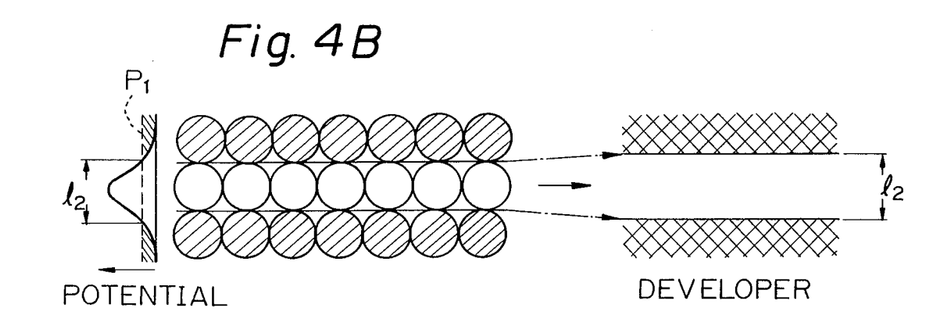

On the other hand, in the background scan system, the laser turn-on and turn-off are opposite to those of the image scan system. Thus, when a black fine line is to be reproduced by the turn-off of the laser, the black fine line is narrowed as shown in FIG. 4A, and when a white fine line is to be reproduced by the trun-on of the laser, the white fine line is widened. Namely, the width $l_1$ of the black fine line is narrower than one pixel width and the width $l_2$ of the white fine line is wider than one pixel width. As a result, a complex character of a small size is reproduced thinly, and the black fine line of one line width may not appear depending on the spot diameter of the laser beam and the development characteristic.

In the prior art image scan system, the black fine line is thickened and the white fine line is narrowed so that the reproduced image tends to be distorted. In the background scan system, the black fine line is narrowed and the white fine line is widened so that the reproduced image tends to be thinned.

Methods for obtaining a fine line of a proper width or a proper image are disclosed in U.S. Pat. Nos. 4,387,983; 4,476,474; and 4,517,579 assigned to the assignee of the present invention, but further improvement of those methods has been sought.

SUMMARY OF THE INVENTION

It is an object of the present invention to eliminate the drawbacks described above.

It is another object of the present invention to improve a beam recorder.

It is yet another object of the present invention to provide a beam recorder capable of reproducing a high quality of image.

It is still another object of the present invention to provide a beam recorder capable of reproducing a sharp image with a simple construction.

It is yet another object of the present invention to provide a beam recorder capable of exactly reproducing an input image signal.

It is still another object of the present invention to provide a beam recorder capable of recording a fine line of an appropriate width.

Other objects of the present invention will be apparent from the following description and claims.

DETAILED DESCRIPTION OF THE PREFERRED EMBODIMENTS

Figure 1:
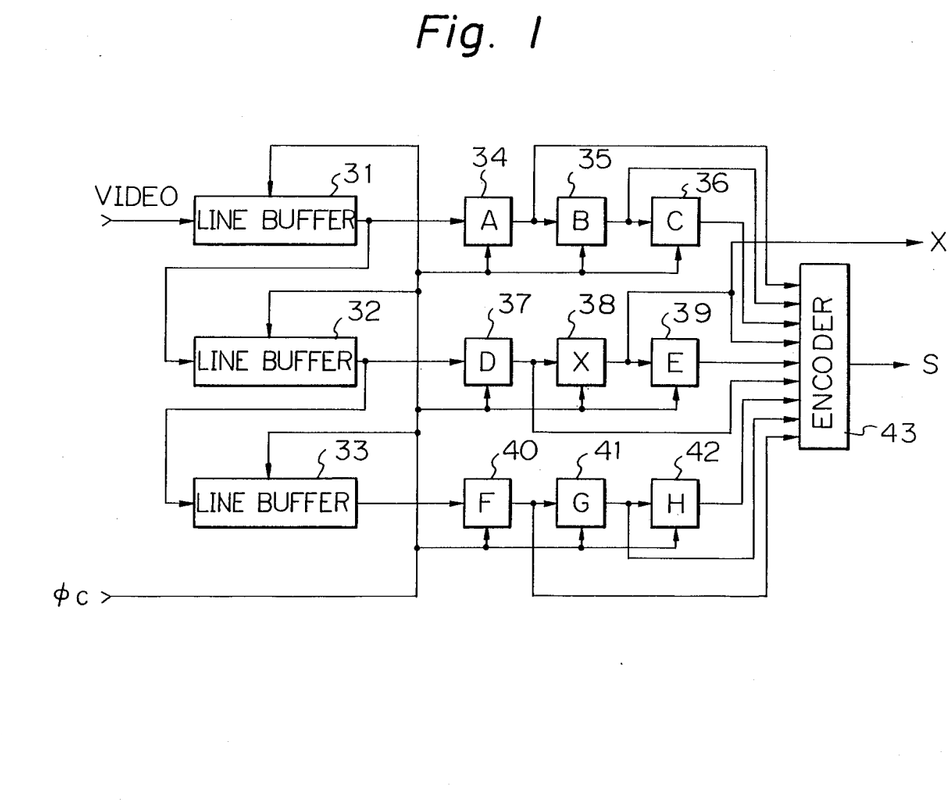
FIG. 1 shows a fine line detector in one embodiment of the present invention.

FIG. 1 shows a block diagram of a detector for detecting black fine line and white fine line in one embodiment of the present invention. Line buffers 31, 32 and 33 each has a capacity to store one main scan of pixel data and those three line buffers 31-33 store three main scans of pixels which are continuous in a sub-scan direction. Latches 34-42 hold the three pixles of pixel data supplied from the line buffers 31-33. Eight pixels around a pixel under consideration (the pixel held at the latch X 38) are discriminated and an encode output signal S from the encoder 43 is used to modulate a laser beam.

Figure 5:
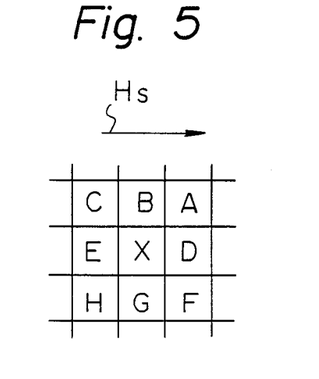
FIG. 5 shows a matrix of a pixel under consideration and adjacent pixels.
Figure 6A:
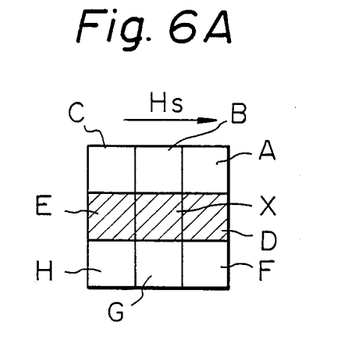
FIGS. 6A to 6D show a detection condition for a black fine line in the image scan system.
Figure 6B:
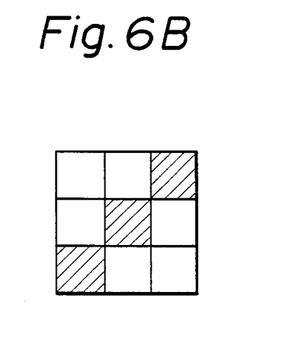
Figure 6C:
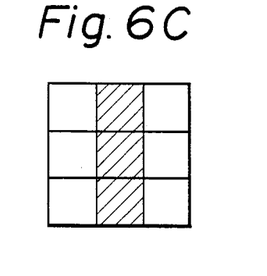
Figure 6D:
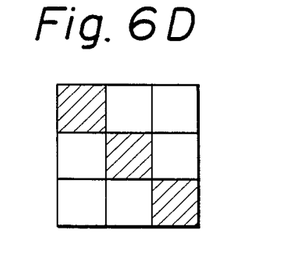
Figure 7A:
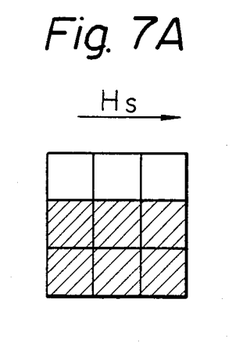
FIGS. 7A to 7H show a detection condition for a white fine line in the image scan system.
Figure 7B:
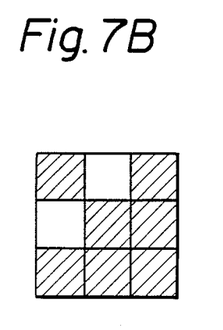
Figure 7C:
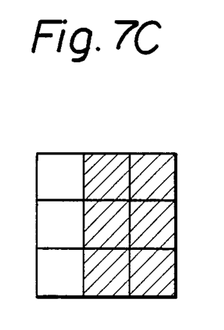
Figure 7D:
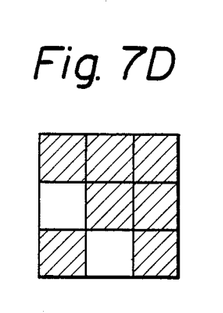
Figure 7E:
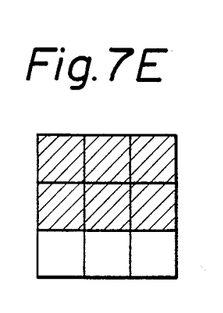
Figure 7F:
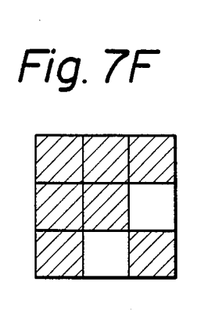
Figure 7G:
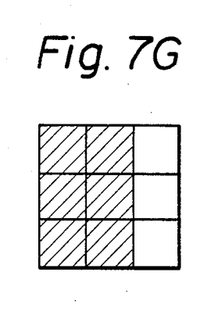
Figure 7H:
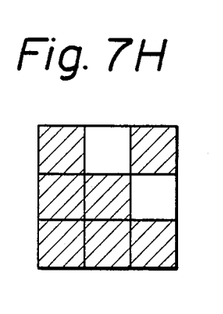
Figure 8A:
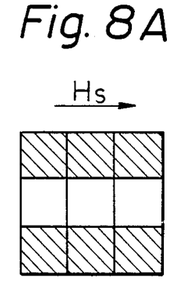
FIGS. 8A to 8D show a detection condition for a white fine line in the background scan system.
Figure 8B:
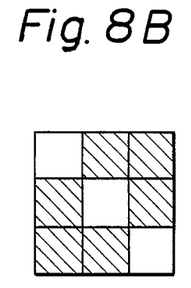
Figure 8C:
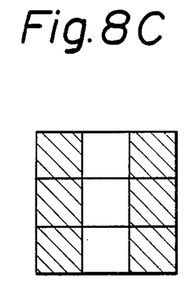
Figure 8D:
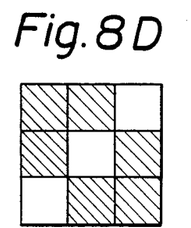
Figure 9A:
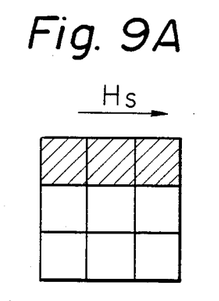
FIGS. 9A to 9H show a detection condition for a black fine line in the background scan system.
Figure 9B:
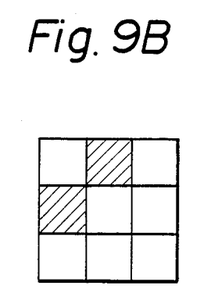
Figure 9C:
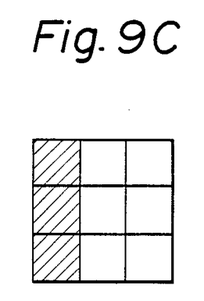
Figure 9D:
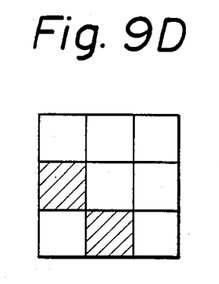
Figure 9E:
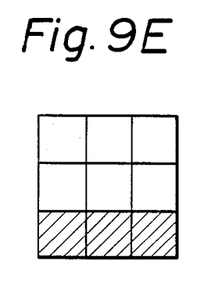
Figure 9F:
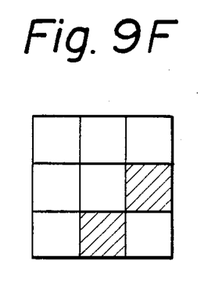
Figure 9G:
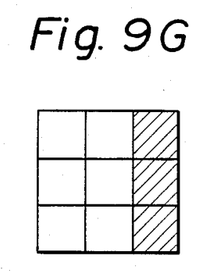
Figure 9H:
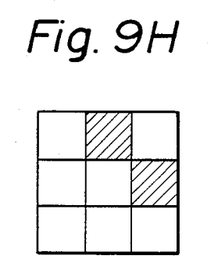

The image signal VIDEO is stored in the three series-connected line buffers 31, 32 and 33 in synchronism with an image clock $\phi c$ which is produced for each pixel so that it is delayed by three lines. The outputs from the line buffers are latched in the latches 34-36, 37-39 and 40-42 in synchronism with the image clock $\phi c$. The outputs from the latches A-H are data of the adjacent pixels which surround the pixel under consideration held at the latch X 38, as shown in FIG. 5. The data levels of the adjacent pixels are thus detected. An arrow Hs shown in FIG. 5 indicates a direction of scan of the laser beam. The nine pixel data outputs from the pixel X and the adjacent pixels A-H are supplied to an encoder 43. In the image scan system, if those values meet the conditions shown in FIGS. 6A-6D, it is determined that the pixel under consideration is a portion of a black fine line and the output S of the encoder 43 is rendered "1" to decrease the laser beam intensity in order to prevent the thickening of the black fine line. In FIG. 6, the square blocks correspond to A-H and X of FIG. 5 and to the image data held in the latches A 34-H 42 of FIG. 1. Hatched areas show black pixels. This also applies to FIGS. 7-9 to be explained later.

On the other hand, in the background scan system, when those values meet the conditions shown in FIGS. 8A-8D, it is determined that the pixel under consideration is a portion of a white fine line and the output S of the encoder 43 is rendered "1" to reduce the laser beam intensity in order to prevent the widening of the white fine line.

In the image scan system, the narrowing of the white fine line is not prevented by controlling the laser beam intensity. Accordingly, the narrowing of the white fine line is prevented by narrowing the black pixels adjacent to the white fine line. When the outputs of the latches A-H meet the conditions shown in FIGS. 7A-7H, it is determined that the pixel X under consideration is the black pixel adjacent to the white fine line and the output S of the encoder 43 is rendered "1" to reduce the laser beam intensity.

On the other hand, in the background scan system, the narrowing of the black fine line is not prevented by controlling the laser beam intensity. Accordingly, the narrowing of the black fine line is prevented by narrowing the white pixels adjacent to the black white line. When the outputs of the latches A-H meet the conditions shown in FIG. 9A-9H, it is determined that the pixel X under consideration is a white pixel adjacent to the black fine line and the output S of the encoder 43 is rendered "1" to reduce the laser beam intensity.

Figure 2:
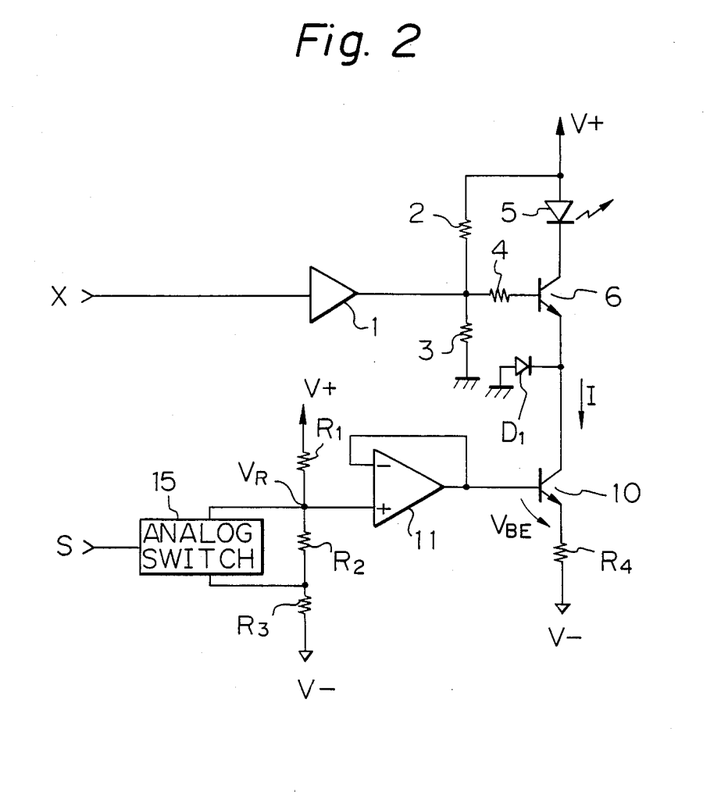
FIG. 2 shows a laser modulator in the embodiment.

A detail of a laser modulator controlled by the output S of the encoder 43 and the output X of the latch X 38 is shown in FIG. 2.

In FIG. 2, the output signal X of the pixel under consideration from the latch X 38 is supplied to a buffer 1, an output of which is voltage level-compensated by terminator resistors 2 and 3 and then applied to a switching transistor 6 through a base resistor 4. When the output signal X is "1" (black in the image scan system and white in the background scan system), the transistor 6 turns on, and when the output signal X is "0" (white in the image scan system and black in the background scan system), the transistor 6 is turned off. When the transistor 6 is turned on, a current I of a constant current source comprising a transistor 10 flows into a laser diode 5 so that the laser diode is fired. When X is "0", the transistor 6 is turned off and the laser diode 5 is not fired. When the transistor 6 is turned off, the current I flows through a diode D1. The light intensity of the laser diode 5 is determined by the current I which flows through the laser diode 5.

Since the current I is determined by a potential at the base of the transistor 10, the current can be controlled by changing the base potential. The base potential of the transistor 10 is given by supplying a voltage $V_R$ produced by dividing a potential between V+ and V− by resistors to a voltage follower comprising an operational amplifier 11 which provides its output to the transistor 10.

In the present embodiment, the potential $V_R$ or the base potential of the transistor 10 is produced by three voltage divider resistors $R_1$, $R_2$ and $R_3$.

$$V_r = V+ = (V+ - V-)(R_2+R_3)/(R_1+R_2+R_3)$$

The laser diode is fired by the current I determined by $V_R$. The current I is represented by $$I = (V_R - V_{BE} - V-)/R_4$$

where $R_4$ is an emitter resistance of the transistor 10 and $V_{BE}$ is a base-emitter voltage. An analog switch 15 is connected in parallel to the resistor $R_2$. The analog switch 15 is turned on when the control signal S is "1", and turned off when it is "0". When the control signal S is "1", the analog switch 15 is turned on and the resistor $R_2$ is shorted so that the potential $V_R$ is represented by $$V- + (V+ - V-)R_3/(R_1+R_3)$$

As a result, the current I decreases and the light intensity of the laser diode 5 decreases.

By using the output S of the encoder 43 of FIG. 1 as the control signal to the analog switch 15, the laser beam intensity can be reduced when the pixel X under consideration is a portion of the black fine line in the image scan system and a portion of the white fine line in the background scan system, or the pixel X under consideration is the adjacent pixels of the white fine line in the image scan system and the adjacent pixels of the black fine line in the background scan system.

In the present embodiment, since the black fine line in the image scan system and the white fine line in the background scan system tend to be thickened, the laser beam intensity which forms the pixel X under consideration is reduced when the pixel X is a portion of the fine line so that a desired fine line is produced.

On the other hand, since the white fine line in the image scan system and the black fine line in the background scan system tend to be narrowed, the current I which determines the light intensity of the laser diode 5 is controlled so that the laser beam intensity for the pixels which indirectly define the pixel X under consideration (pixels adjacent to the pixel X) is controlled. Since the fine line formed by the irradiation of the laser beam tends to be thickened, the laser beam intensity is reduced to obtain a proper line width. Since the fine line formed by non-irradiation of the laser beam tends to be narrowed, the laser beam intensity for the pixels around the fine line is reduced to obtain a proper line width.

In the present embodiment, the laser beam intensity used to prevent the thickening of the fine line formed by the irradiation of the laser beam and the laser beam intensity for the adjacent pixels used to prevent the narrowing of the fine line formed by non-irradiation of the laser beam are equal, although different laser beam intensities may be used by generating separate control signals for the respective conditions.

While the 3×3 matrix is used to detect the fine line in the present embodiment, the matrix size may be enlarged when a higher detection precision is required.

While the fine line having one pixel width is detected in the present embodiment, the width may be two-pixel width or three-pixel width depending on the resolution of the printer.

In accordance with the present embodiment, the laser beam intensity is controlled by detecting the fine line so that the width of the fine line is always optimized, and the image reproducibility in the image scan system and the background scan system is remarkably improved.

The circuits shown in FIGS. 1 and 2 are appplicable to various beam printers including the laser beam printer shown in FIG. 10.

The present invention is not limited to the illustrated embodiment but various modifications may be made without departing from the scope of the claims.

I claim:

1. A beam recorder comprising:
   image signal input means;
   modulation means for modulating a recording beam in accordance with an image signal supplied from said input means; and
   discrimination means for discriminating a characteristic of the image signal supplied from said input means,
   wherein said discrimination means includes memory means for receiving the image data from said input means for each pixel and for storing data of a pixel under consideration and data of adjacent pixels, and said discrimination means discriminates whether the pixel under consideration is a pixel adjacent to a line or not in accordance with the pixel under consideration and the adjacent pixels, said discrimination means discriminating whether the pixel under consideration is adjacent to a line or not in a plurality of directions; and
   wherein said modulation means controls a drive current for emitting the beam to change an intensity of the beam in accordance with a discrimination result of said discrimination means.

2. A beam recorder according to claim 1 wherein said discrimination means discriminates the characteristic for each pixel in accordance with the image signal supplied from said input means.

3. A beam recorder according to claim 2 wherein said discrimination means discriminates whether the pixel under consideration is a portion of a line or not in accordance with the pixel under consideration and the adjacent pixels.

4. A beam recorder according to claim 1 further comprising beam generation means adapted to be driven by said modulation means, said beam generation means including a laser diode as a light source.

5. A beam recorder according to claim 1 wherein said modulation means changes the driving current for emitting the beam in a plurality of steps so that the intensity of the beam is varied in a plurality of steps.

6. A beam recorder comprising:
   image signal input means;
   modulation means for modulating a recording beam in accordance with an image signal supplied from said input means; and discrimination means for discriminating a characteristic of the image signal supplied from said input means, wherein said discrimination means discriminates whether a pixel under consideration is a portion of a line or not by discriminating pixels adjacent the pixel under consideration in a plurality of directions, in accordance with the image signal supplied from said input means, and wherein said modulation means controls a drive current for emitting a beam to change an intensity of the beam in accordance with a discrimination result of said discrimination means.

7. A beam recorder according to claim 6 wherein said discrimination means discriminates the characteristic for each pixel in accordance with the image signal supplied from said input means.

8. A beam recorder according to claim 7 wherein said discrimination means includes memory means for receiving the image signal from said input means for each pixel and for storing data of a pixel under consideration and data of adjacent pixels, and said discrimination means discriminates whether the pixel under consideration is a portion of a line or not in accordance with the pixel under consideration and the adjacent pixels.

9. A beam recorder according to claim 6 wherein said modulation means changes the driving current for emitting the beam in a plurality of steps so that the intensity of the beam is varied in a plurality of steps.

10. A beam recorder comprising:
image signal input means;
modulation means for modulating a recording beam in accordance with an image signal supplied from said input means; and
discrimination means for discriminating a characteristic of the image signal applied from said input means, wherein said modulation means controls the recording beam in accordance with a discrimination result of said discrimination means, and wherein said discrimination means discriminates whether a pixel under consideration is associated with a line or not by discriminating pixels adjacent the pixel under consideration in a plurality of directions in response to the image signal supplied from said input means.

11. A beam recorder according to claim 10, wherein said discrimination means includes memory means for receiving the image signal from said input means for each pixel and for storing data of the pixel under consideration and data of the adjacent pixels, and wherein said discrimination means discriminates whether the pixel under consideration is a pixel adjacent to a line or not in accordance with the pixel under consideration and the adjacent pixels.

12. A beam recorder according to claim 10, wherein said discrimination means includes memory means for receiving the image signal from said input means for each pixel and for storing data of the pixel under consideration and data of the adjacent pixels, and wherein said discrimination means discriminates whether the pixel under consideration is a portion of a line or not in accordance with the pixel under construction and the adjacent pixels.

13. A beam recorder according to claim 10, wherein said modulation means controls a drive current for emitting the beam to change an intensity of the beam in accordance with a discrimination result of said discrimination means.

* * * * *

UNITED STATES PATENT AND TRADEMARK OFFICE
CERTIFICATE OF CORRECTION

PATENT NO. : 4,878,068
DATED : October 31, 1989
INVENTOR(S) : YOSHIYUKI SUZUKI

It is certified that error appears in the above-identified patent and that said Letters Patent is hereby corrected as shown below:

COLUMN 1

Line 62, "printers" should read --printer--.

COLUMN 2

Line 6, "a" should be deleted.
    Line 31, "and ●" should read --and ⊘--.
    Line 41, "white fin line" should read --white fine line--.
    Line 51, "in order prevent" should read --in order to prevent--.

COLUMN 4

Line 45, "black white line." should read --black fine line.--.

COLUMN 5

Line 15, "$V_r = V+ = (V+ - V-)(R_2+R_3)/(R_1+R_2+R_3)$" should read --$V_r = V- + (V+ - V-)(R_2+R_3)/(R_1+R_2+R_3)$--.

COLUMN 7

Line 11, "a beam" should read --the beam--.

UNITED STATES PATENT AND TRADEMARK OFFICE
CERTIFICATE OF CORRECTION

PATENT NO. : 4,878,068

DATED : October 31, 1989

INVENTOR(S) : YOSHIYUKI SUZUKI

It is certified that error appears in the above-identified patent and that said Letters Patent is hereby corrected as shown below:

COLUMN 8

Line 29., "construction" should read --consideration--.

Signed and Sealed this

Thirteenth Day of August, 1991

Attest:

HARRY F. MANBECK, JR.

*Attesting Officer*  *Commissioner of Patents and Trademarks*